US008272539B2

(12) United States Patent
Ophardt et al.

(10) Patent No.: US 8,272,539 B2
(45) Date of Patent: Sep. 25, 2012

(54) ANGLED SLOT FOAM DISPENSER

(75) Inventors: Heiner Ophardt, Vineland (CA); Andrew Jones, Smithville (CA); Padraig McDonagh, Ballymote (IE); Zhenchun (Tony) Shi, Hamilton (CA)

(73) Assignee: Gotohti.Com Inc., Beamsville (CA)

( * ) Notice: Subject to any disclaimer, the term of this patent is extended or adjusted under 35 U.S.C. 154(b) by 788 days.

(21) Appl. No.: 12/314,091

(22) Filed: Dec. 3, 2008

(65) Prior Publication Data

US 2009/0145296 A1 Jun. 11, 2009

(30) Foreign Application Priority Data

Dec. 7, 2007 (CA) ...................................... 2613785

(51) Int. Cl.
*F16J 9/00* (2006.01)

(52) U.S. Cl. .................. 222/181.1; 222/321.1; 417/259; 417/262

(58) Field of Classification Search ............... 222/181.3, 222/321.1; 417/259, 262, 491, 495
See application file for complete search history.

(56) References Cited

U.S. PATENT DOCUMENTS

| | | | |
|---|---|---|---|
| 5,165,577 | A | 11/1992 | Ophardt |
| 5,282,552 | A | 2/1994 | Ophardt |
| 5,373,970 | A | 12/1994 | Ophardt |
| 5,431,309 | A | 7/1995 | Ophardt |
| 5,489,044 | A | 2/1996 | Ophardt |
| 5,676,277 | A | 10/1997 | Ophardt |
| 5,836,482 | A | 11/1998 | Ophardt et al. |
| 5,975,360 | A | 11/1999 | Ophardt |
| 6,409,050 | B1 | 6/2002 | Ophardt et al. |
| 6,446,840 | B2 | 9/2002 | Ophardt et al. |
| 6,540,157 | B2 | 4/2003 | Ophardt |
| 6,557,736 | B1 | 5/2003 | Ophardt |
| 6,601,736 | B2 | 8/2003 | Ophardt et al. |
| 6,957,751 | B2 | 10/2005 | Ophardt |
| 7,198,175 | B2 | 4/2007 | Ophardt |
| 7,225,948 | B2 | 6/2007 | Ophardt et al. |
| 7,267,251 | B2 | 9/2007 | Ophardt |
| 7,303,099 | B2 | 12/2007 | Ophardt |
| 7,337,930 | B2 | 3/2008 | Ophardt et al. |
| RE40,319 | E | 5/2008 | Ophardt et al. |
| 2002/0158085 | A1* | 10/2002 | Ophardt et al. ............ 222/383.1 |
| 2005/0161476 | A1 | 7/2005 | Ophardt |
| 2005/0205600 | A1 | 9/2005 | Ophardt |
| 2006/0175354 | A1 | 8/2006 | Ophardt |
| 2006/0237483 | A1 | 10/2006 | Ophardt |
| 2006/0249538 | A1 | 11/2006 | Ophardt |
| 2006/0261092 | A1 | 11/2006 | Ophardt |
| 2007/0257064 | A1 | 11/2007 | Ophardt |
| 2007/0284394 | A1 | 12/2007 | Ophardt |

* cited by examiner

*Primary Examiner* — Tracie Y Green
(74) *Attorney, Agent, or Firm* — Thorpe North & Western LLP

(57) ABSTRACT

The present invention provides a piston pump for liquid in which a sump is defined in a chamber into which sump liquid in the chamber flows due to gravity. A passageway leads from an outlet of the sump out of the chamber to a dispensing outlet. The dispensing outlet is at a height below the height of the sump outlet and fluid to exit the sump flows from the sump outlet upwardly in a first portion of the passageway to a height above the sump outlet then downwardly to the dispensing outlet. The chamber and its sump is defined between a piston chamber-forming member defining the chamber to be downwardly opening and a piston forming element axially slidable in the chamber.

20 Claims, 11 Drawing Sheets

Fig.6
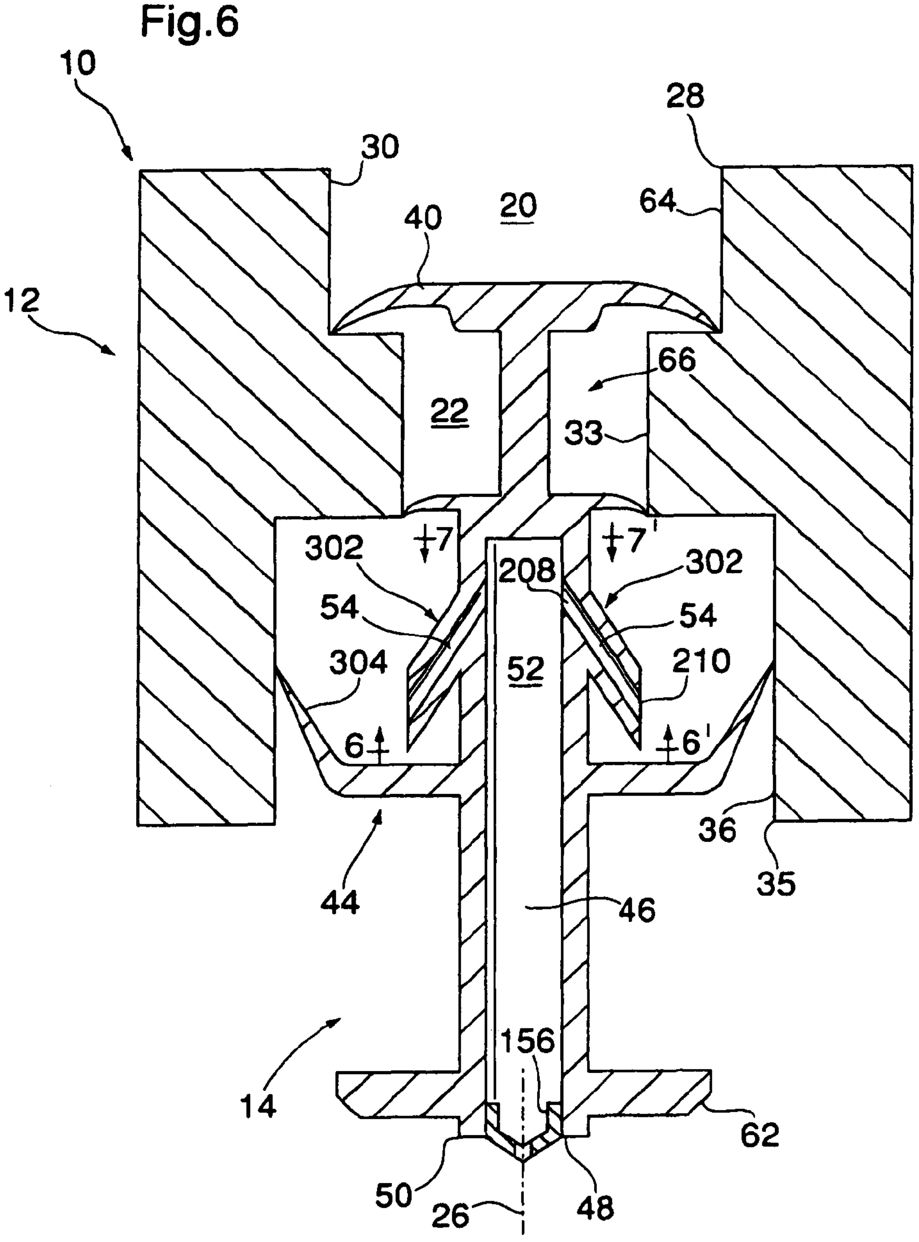
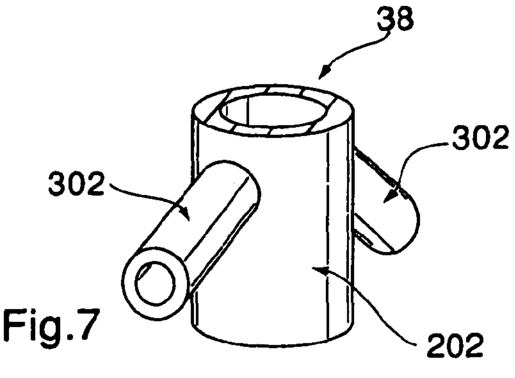
Fig.7

ANGLED SLOT FOAM DISPENSER

SCOPE OF THE INVENTION

This invention relates to liquid dispensers and, more particularly, piston pump liquid dispensers.

BACKGROUND OF THE INVENTION

Liquid dispensers for dispensing soaps and other fluids in liquid form are known. In some applications, it is preferable to dispense soaps and alcohol and other fluids in the form of a foam. Generally, as a foam, less soap or alcohol liquid is required to be used as, for example, for proper hand cleaning. As well, soap or alcohol as foam is less likely to run off a user's hands or other surfaces to be cleaned.

The present inventors have appreciated the disadvantage that in many foam pumps, foam is drawn back into the pump, when the pump is left unused for a period of time, the foam which has been drawn back into the pump coalesces, that is, separates into liquid and air with the passage of time. This coalescence of foam within the pump raises a level of liquid in a chamber in the pump. Pumps in which the chamber which the coalescence takes place is open to an outlet, liquid can drip under gravity from the chamber out of the outlet.

The present inventors have also appreciated that in many non-foaming liquid pumps the disadvantage arises that when the pump is left unused for a period of time liquid drips out of the outlet.

SUMMARY OF THE INVENTION

To at least partially over come the disadvantages of known dispensers, the present invention provides an improved pumping arrangement for dispensing a fluid, preferably together with air, and reducing dripping when the dispenser is not in use.

An object of the present invention is to provide an improved pump for dispensing liquid.

Another object is to provide an improved pump for dispensing a liquid simultaneously with air.

The present invention provides a piston pump for liquid in which a sump is defined in a chamber into which sump liquid in the chamber flows due to gravity. A passageway leads from an outlet of the sump out of the chamber to a dispensing outlet. The dispensing outlet is at a height below the height of the sump outlet and fluid to exit the sump flows from the sump outlet upwardly in a first portion of the passageway to a height above the sump outlet then downwardly to the dispensing outlet. The chamber and its sump is defined between a piston chamber-forming member defining the chamber to be downwardly opening and a piston forming element axially slidable in the chamber. The passageway is preferably provided within the piston-forming element providing communication across a sealing member disposed between the piston chamber-forming member and the piston-forming element. Preferably, the dispensing outlet is provided at an outer end of the piston-forming member which extends outwardly from the chamber with the dispensing outlet directed downwardly out of the chamber. In a preferred embodiment, the piston pump is adapted to have both air and fluid within the chamber and may preferably be adapted to dispense both air and fluid simultaneously to produce foam or an atomized spray.

By reason of the passageway via which fluid is to exit the chamber extending upwardly from the sump outlet then downwardly, dripping from the dispensing outlet of the pump between cycles of dispensing can be reduced. In the preferred embodiments, dripping of liquid from the sump requires liquid to achieve a height in the sump above the height to which fluid in the passageway must be raised to flow downwardly to the dispensing outlet.

In one aspect, the present invention provides a piston pump for dispensing fluids including liquid from a chamber out an outlet which is at a height below a height of fluid in the chamber, and in which the chamber is always open to the outlet and the chamber is in operation to simultaneously have both liquid and air in the chamber, the improvement comprising a passageway from the chamber to the outlet, the passageway having two portions, namely a first portion extending from the outlet upwardly to an upper end and a second portion extending from the upper end downwardly to an inner end open to the chamber at a first height, and the upper end at a second height higher than the first height and at a height above a height of the outlet.

In another aspect, the present invention provides a piston pump assembly having a first pump comprising:

a piston chamber-forming member having a first chamber disposed about a first central axis and having a cylindrical side wall, an axially outer end of the first chamber being open downwardly, a piston-forming element received in the first chamber axially slidable inwardly and outwardly therein between an outward extended position and an inward retracted position, the piston-forming element having an axially extending stem, a first disc spanning radially between the stem and the first chamber side wall preventing fluid flow outwardly therepast, a passageway through the stem providing communication from inside the first chamber outwardly past the first disc through the outer end of the first chamber, the passageway opening at an inner end in the first chamber and at an outer end outwardly of the first disc, the passageway having a first portion and a second portion, the first portion extending from the outer end to an upper end, the upper end disposed at a height above the outer end, the second portion extending from the upper end downwardly to the inner end, the inner end disposed at a height below the upper end, and the inner end disposed at a height above the outer end.

BRIEF DESCRIPTION OF THE DRAWINGS

Further aspects and advantages of the present invention will become apparent from the following description taken together with the accompanying drawings in which:

FIG. 6 is a cross-sectional side view of a pump assembly in accordance with a third embodiment of the present invention showing the piston in an extended position;

FIG. 7 is a schematic pictorial view of the piston in FIG. 6 between section lines 6-6' and 7-7';

DETAILED DESCRIPTION OF THE DRAWINGS

Figure 2:
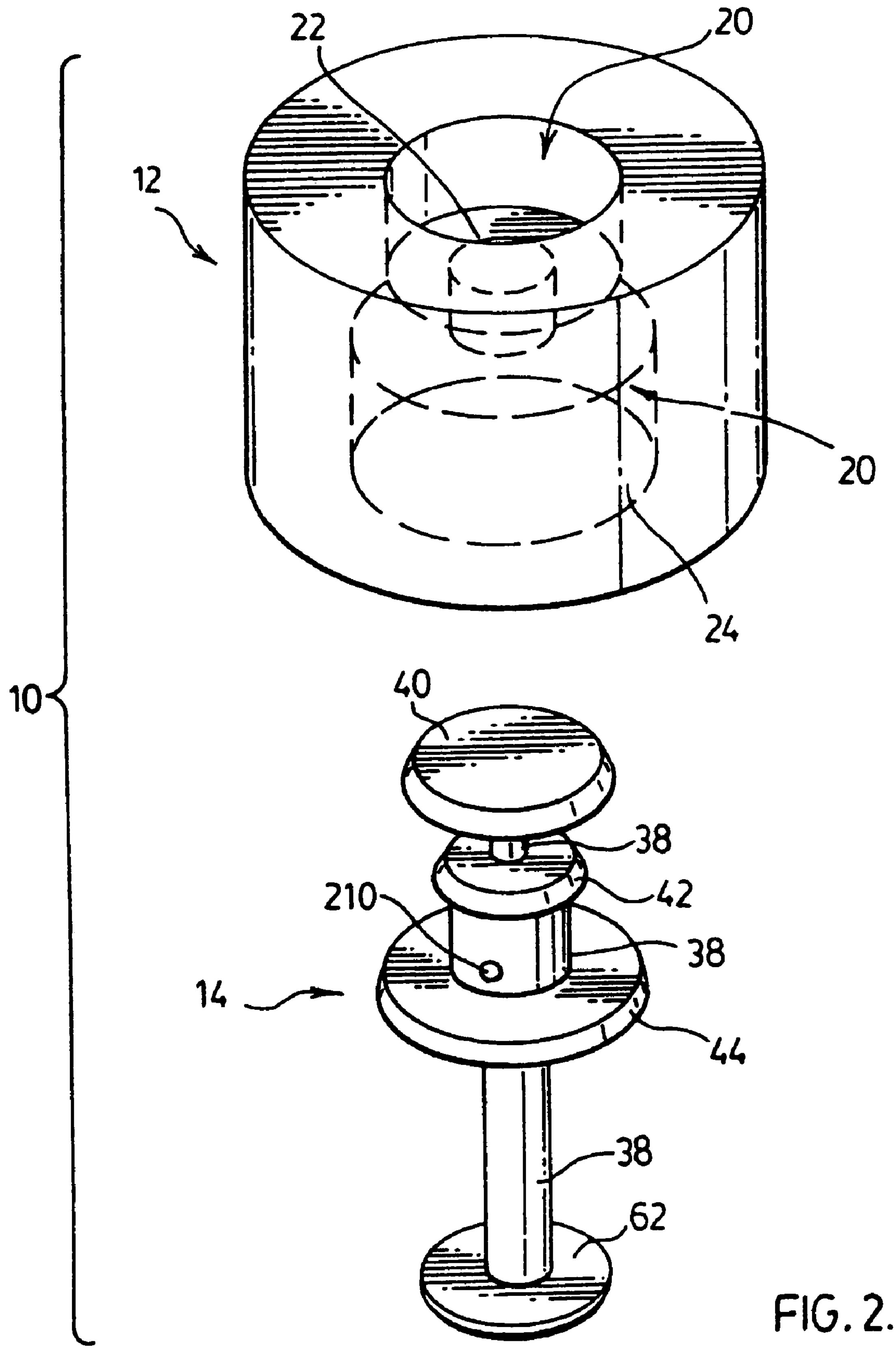
FIG. 2 is a partially exploded perspective view of the pump assembly shown in FIG. 1.
Figure 3:
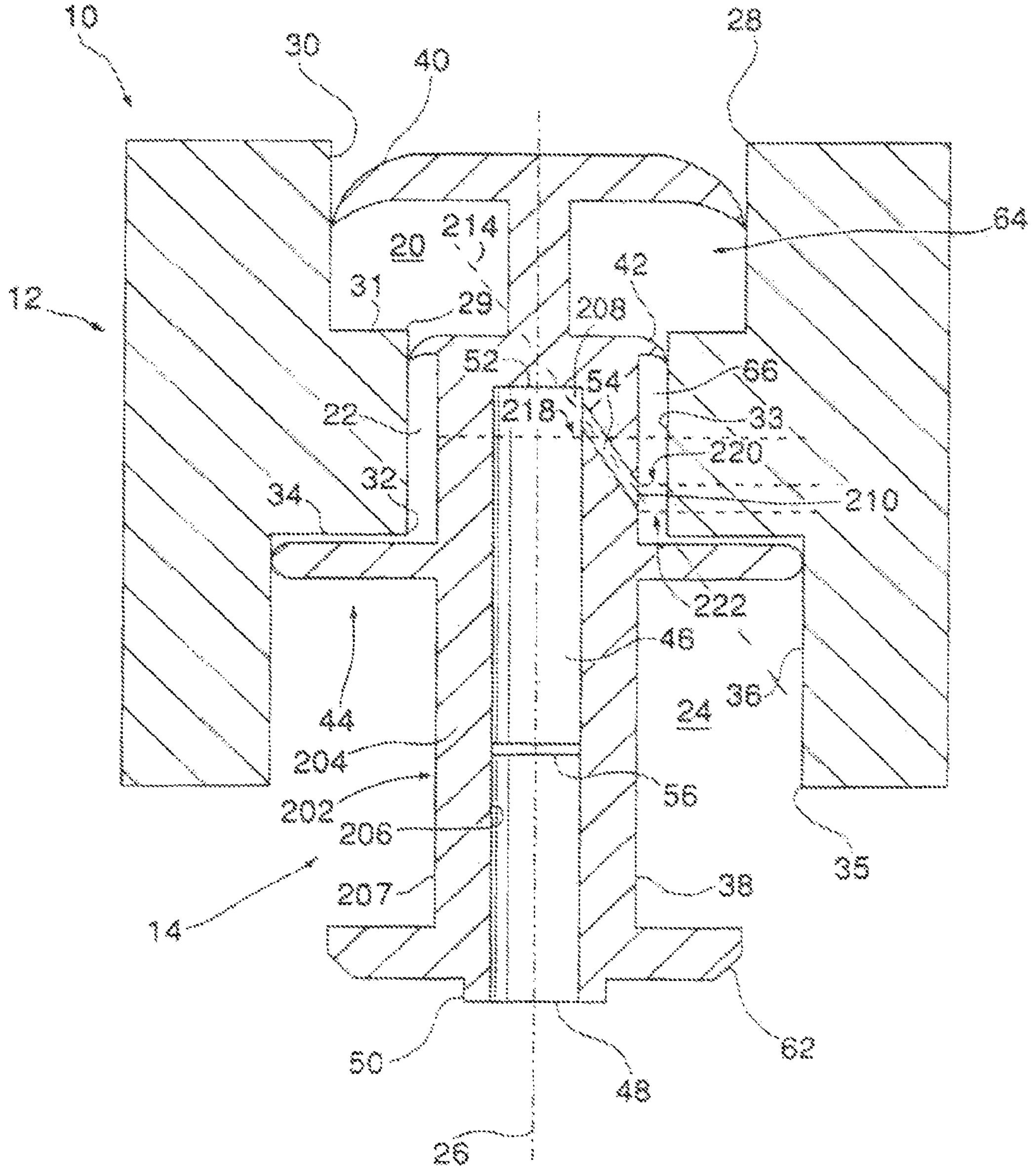
FIG. 3 is a cross-sectional side view of an assembled pump assembly of FIG. 2 showing the piston in a fully retracted position.
Figure 4:
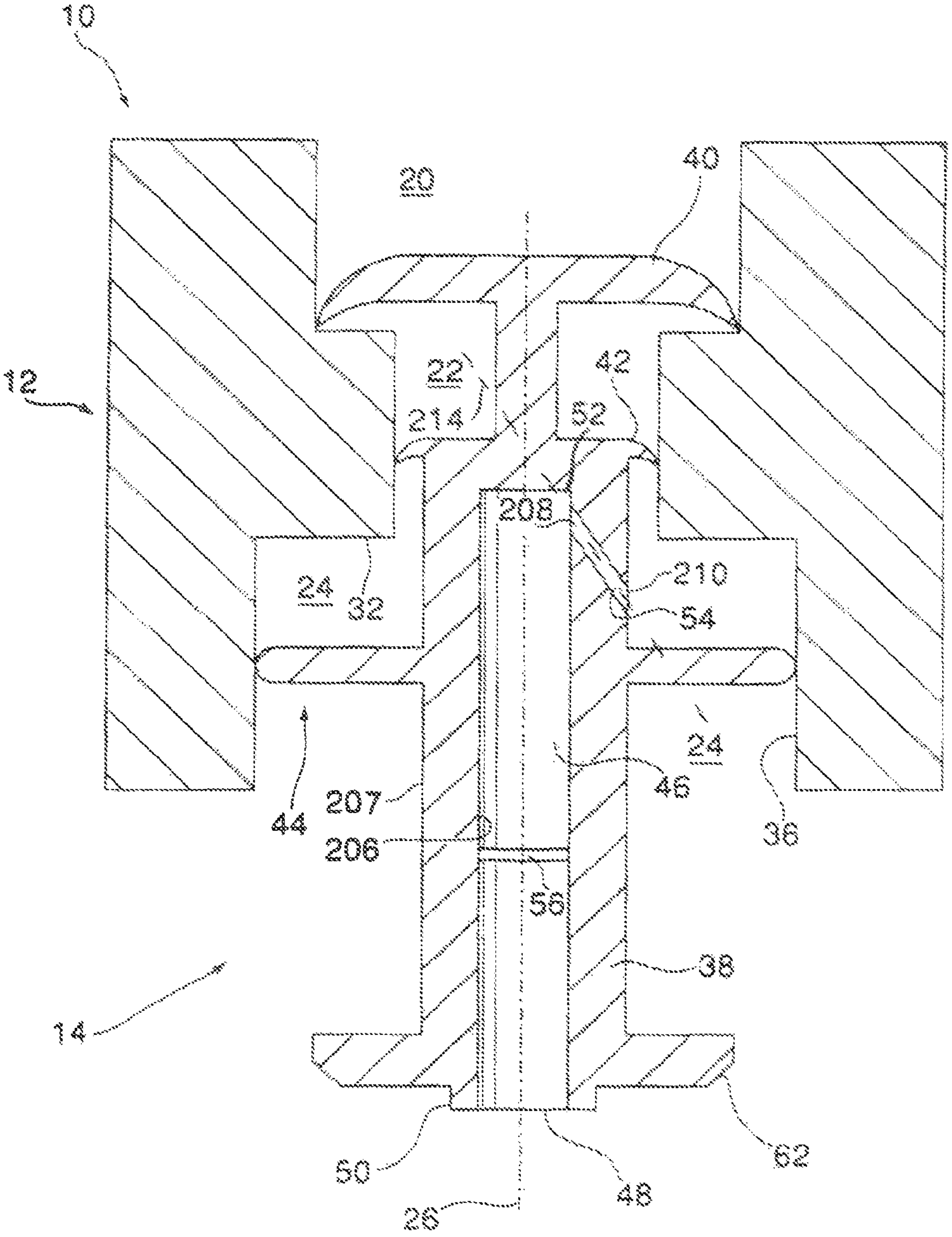
FIG. 4 is the same side view as in FIG. 3 but showing the pump in a fully extended position.

Reference is made first to FIGS. 2, 3 and 4 which show a first embodiment of a pump assembly generally indicated 10. Pump assembly 10 is best shown in FIG. 2 as comprising two principal elements, a piston chamber-forming member or body 12 and a piston forming element or piston 14.

The piston chamber-forming body 12 has three cylindrical portions illustrated to be of different radii, forming three chambers, an inner chamber 20, an intermediate chamber 22, and an outer chamber 24, all coaxially disposed about an axis 26. The intermediate cylindrical chamber 22 is of the smallest radii. The outer cylindrical chamber 24 is of a radius which is larger than that of the intermediate cylindrical chamber 22. The inner cylindrical chamber 20 is of a radius greater than that of the intermediate cylindrical chamber 22 and, as well, is shown to be of a radius which is less than the radius of the outer cylindrical chamber 24.

The inner chamber 20 has an inlet opening 28 and an outlet opening 29. The inner chamber has a cylindrical chamber side wall 30. The outlet opening 29 opens into an inlet end of the intermediate chamber 22 from an opening in a shoulder 31 forming an outer end of the inner chamber 20. The intermediate chamber 22 has an inlet opening, an outlet opening 32, and a cylindrical chamber side wall 33. The outlet opening 32 of the intermediate chamber 22 opens into an inlet end of the outer chamber 24 from an opening in a shoulder 34 forming the inner end of the outer chamber 24. The outer chamber 24 has an inlet opening, outlet opening 35 and a cylindrical chamber side wall 36.

Piston 14 is axially slidably received in the body 12. The piston 14 has an elongate stem 38 upon which four discs are provided at axially spaced locations. An inner flexing disc 40 is provided at an innermost end spaced axially from an intermediate flexing disc 42 which, in turn, is spaced axially from an outer sealing disc 44. The inner disc 40 is adapted to be axially slidable within the inner chamber 20. The intermediate disc 42 is adapted to be axially slidable within the intermediate chamber 22.

The intermediate disc 42 has a resilient peripheral edge which is directed outwardly and adapted to prevent fluid flow inwardly yet to deflect to permit fluid flow outwardly therepast. Similarly, the inner disc 40 has a resilient outer peripheral edge which is directed outwardly and is adapted to prevent fluid flow inwardly yet to deflect to permit fluid flow outwardly therepast.

The outer sealing disc 44 is adapted to be axially slidable within the outer cylindrical chamber 24. The outer sealing disc 44 extends radially outwardly from the stem 38 to sealably engage the side wall 36 of the outer chamber 24, and prevent flow therepast either inwardly or outwardly.

The piston 14 essentially forms, as defined between the inner disc 40 and the intermediate disc 42, an annular inner compartment 64 which opens radially outwardly as an annular opening between the discs 40 and 42. Similarly, the piston 14 effectively forms between the intermediate sealing disc 42 and the outer sealing disc 44 an annular outer compartment 66 which opens radially outwardly as an annular opening between the discs 42 and 44.

The stem 38 has an outermost hollow tubular portion 202 with a cylindrical side wall 204 generally coaxially about the central axis 26 defining a central passageway 46 within the tubular portion 202. The central passageway 46 extends from an outlet 48 at the outermost end 50 of the stem 38 centrally through the stem 38 to a closed inner end 52.

The cylindrical side wall 204 of the hollow tubular portion 202 of the stem 38 extends radially of the central axis 26 from an inner side wall surface 206 to an outer side wall surface 207. An inlet passageway 54 provides communication through the stem 38 into the central passageway 46. The inlet passageway 54 extends through the cylindrical side wall 204 from an inner opening 208 in the inner side wall surface 206 to an outer opening 210 in the outer side wall surface 207. The inlet passageway 54 has its outlet opening 210 located on the stem 38 in between the outer disc 44 and the intermediate disc 42. The inlet passageway 54 in extending from the inner opening 208 to the outer opening 210 extends radially outwardly and axially outwardly so as to provide the inlet opening 210 located on the stem 38 axially inwardly from the outlet opening 210. The inlet passageway 54 extends about an inlet axis 214 extending in a flat plane including the central axis 26 and with the inlet axis 214 in that flat plane extending at an angle to the central axis 26 as the inlet axis 214 extends radially outwardly and axially outwardly. The inlet passageway 54 is axially circular in any cross-section about its inlet axis 214.

The inlet passageway 54 has its coaxially outermost portion of its inner opening 208 at a height indicated by dashed horizontal line 218. For fluid in the annular outer compartment 66 to flow under gravity into the central passageway 46 fluid in the annular outer compartment 66 must be at a height above the height of line 218.

The inlet passageway 54 has an axially outermost portion of its outer opening 210 at a height indicated by dashed horizontal line 222 and an axially innermost portion of its outer opening 210 at a height indicated by dashed horizontal line 220. As shown, the line 218 is at a height vertically above the height of the line 220 and the line 222 that is axially inward as shown.

Communication is provided between the outlet 48 and the outer opening 210 via a continuous passageway formed by a first portion consisting of the central passageway 46 between the outlet 48 and the inner opening 208 and a second portion consisting of the inlet passageway 54 between the inner opening 208 and the outer opening 210. As seen, the inner opening 208 is an upper end of this first portion which inner opening 208 is at a height above the outlet 48 forming an outer end of this first portion. As well, the outer opening 210 forming an inner end of the continuous passageway is disposed at a height below the inner opening 208. The outer end 210 is also disposed at a height above the outlet 48.

A foam inducing screen 56 is provided in the central passageway 46 intermediate between the inner opening 208 and the outlet 48. The screen 56 may be fabricated of plastic, wire or cloth material. It may comprise a porous ceramic measure.

The screen 56 provides small apertures through which an air and liquid mixture may be passed to aid foam production as by production of turbulent flow through small pores or apertures of the screen thereof in a known manner.

The piston 14 carries an engagement flange or disc 62 on the stem 38 outward from the outer sealing disc 44. The engagement disc 62 is provided for engagement by an activating device in order to move the piston 14 in and out of the body 12.

In a withdrawal stroke with movement from the retracted position of FIG. 3 to the extended position of FIG. 4, the volume between the inner disc 40 and the intermediate disc 42 decreases such that fluid is displaced outwardly past the intermediate disc 42 to between the intermediate disc 42 and the outer disc 44. At the same time, the volume in the annular outer compartment 66 between the intermediate disc 42 and the outer disc 44 increases, with such increase being greater than the volume decrease in the annular inner compartment 64 between the inner disc 40 and the intermediate disc 42 such that in addition to the fluid displaced outwardly past intermediate disc 42, what is referred to herein as inhaled material namely air, liquid and/or foam is drawn inwardly via the outlet 48, central passageway 46, and the inlet passageway 54 into the annular outer compartment 66 between the intermediate disc 42 and the outer disc 44.

In a retraction stroke from the position of FIG. 4 to the position of FIG. 3, the volume in the annular outer compartment 66 between the intermediate disc 42 and the outer disc 44 decreases such that what is referred to herein as exhaled material namely air, liquid and/or foam in the annular outer compartment 66 and in the central passageway 46 above the screen 56 is forced under pressure out through the screen 56. Air and liquid simultaneously passing through the screen 56 is mixed and commingled producing foam which is discharged out the outlet 48. At the same time, in the retraction stroke, the volume in the annular outer compartment 66 between the inner disc 40 and the intermediate disc 42 increases drawing liquid from inside the fluid containing reservoir or container past the inner disc 40.

Reciprocal movement of the piston 14 between the retracted and extended positions will successively draw and pump precise amounts of liquid from the container and mix such liquid with air from the atmosphere and dispense the liquid commingled with the air as a foam.

In a typical withdrawal stroke, the inhaled material includes material in the inlet passageway 54 and the central passageway 46, whether inwardly or outwardly of the screen 56, at the end of the last retraction stroke. Such material may typically include foam which substantially fills the central passageway 46 outward of the screen, and foam, liquid and/or air in the central passageway 46 inwardly of the screen 56 and foam, liquid and/or air in the inlet passageway 54. Drawback of such inhaled materials, particularly drawback through the screen 56, or through the smaller diameter inlet passageway 54, may result in additional foam being produced.

The annular outer compartment 66 is, in effect, a closed bottom compartment forming a sump whose bottom is defined by the outer disc 44, sides are defined by the side wall 36 and the inner side wall surface 206 of the stem 38 and with an overflow outlet defined by the inner opening 208 of the inlet passageway 54. The lowermost portion of inner opening 208 of the inlet passageway 54 is at a constant height indicated by line 218 above the outer disc 44, and this height together with the difference in radius of the side wall 36 and the inner side wall surface 206 of the stem 38 define a sump volume being the volume of liquid which may be retained within the annular outer compartment 66 above the outer disc 44 against over flow out the inlet passageway 54 to the central passageway 46.

In a retraction stroke, the material in the annular outer compartment 66 is forced out of the outer compartment 66 via the outer opening 210 of the inlet passageway 54. In the retraction stroke, the expelled material includes air and due to a venturi effect, the air being expelled through the outer opening 210 of the inlet passageway 54 entrains liquid and foam in the sump in the annular outer compartment 66 and draws the level of material in the sump down typically to the height indicated by line 222, or at least to a height between the line 220 and the line 222. Subsequently, in the next withdrawal stroke, the inhaled material is drawn into the annular outer compartment 66 via the inlet passageway 54 and, simultaneously, a next allotment of liquid from the annular inner compartment 64 is forced from the annular inner compartment 64 past the intermediate disc 42 into the annular outer compartment 66. The inhaled material and the allotment of liquid come to sit in the sump with the liquid at the bottom of the sump, the foam above the liquid and air above the foam. With the passage of time, foam in the sump will tend to coalesce, that is, separate into air and liquid, with such coalesced liquid increasing the level of liquid in the sump. In so far as the level of liquid in the sump is below the line 218 liquid will not flow due to gravity from the outer compartment 66 into the central passageway 46. The volume of liquid which may come to settle in the bottom of the sump without over flow from the sump via the inlet passageway 54 is represented by the difference in heights of the outer opening 210 and the inner opening 208, more particularly, at least the difference in height between line 220 and line 218 and, more typically, the difference in height between the line 222 and 218. This volume will also be a function of the radius of the sump over its height. Each of increasing the height of the inner opening 208 above the outer opening 210 and increasing the radius of the sump can increase the volume which can be accommodated in the sump before over flow from the sump will occur.

In contract with a prior art arrangement in the inlet passageway 54 extends merely radially horizontally providing the equivalent of the inner opening and the outer opening of the inlet passageway at the same height, the arrangement of the present invention with the inner opening 208 at a height above the outer opening 210 reduces the tendency of the pump to drip between strokes.

Operation of the pump assembly illustrated in FIGS. 2 to 4 will draw liquid out of a container creating a vacuum therein. The pump assembly is preferably adapted for use with a collapsible container. Alternatively, a suitable vent mechanism may be provided if desired as, for example, for use in a non-collapsible container to permit atmospheric air to enter the container and prevent a vacuum being built up therein.

Both the piston 14 and the body 12 may be formed as unitary elements or from a minimal number of elements from plastic as by injection molding.

Figure 1:
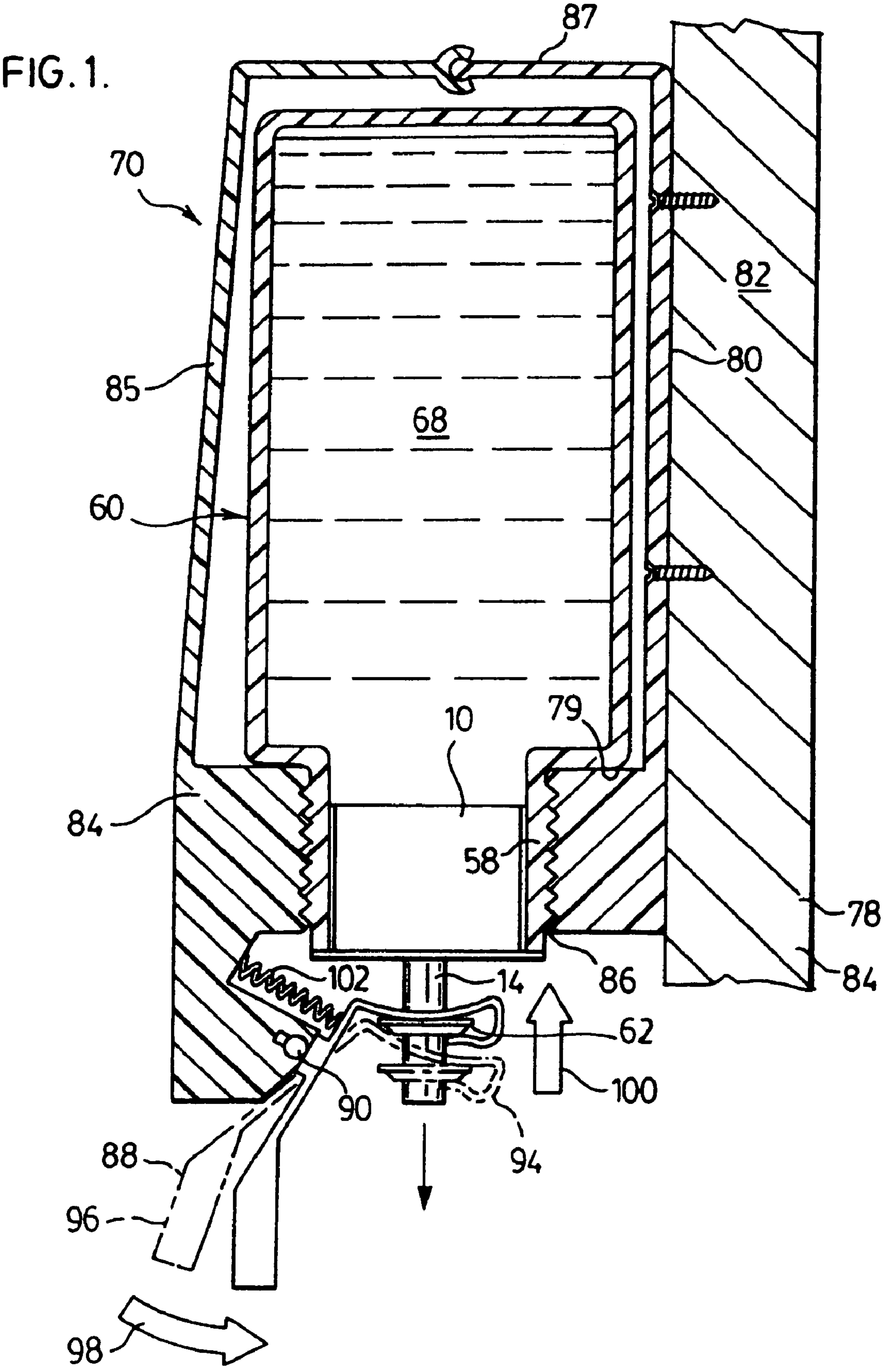
FIG. 1 is a partially cut-away side view of a preferred first embodiment of a liquid dispenser with a reservoir and pump assembly in accordance with the present invention.

Reference is now made to FIG. 1 which shows a liquid soap dispenser generally indicated 70 utilizing the pump assembly 10 of FIGS. 2 to 4 secured in the neck 58 of a sealed, collapsible container or reservoir 60 containing liquid hand soap 68 to be dispensed. Dispenser 70 has a housing generally indicated 78 to receive and support the pump assembly 10 and the reservoir 60. Housing 78 is shown with a back plate 80 for mounting the housing, for example, to a building wall 82. A bottom support plate 84 extends forwardly from the back plate to support and receive the reservoir 60 and pump assembly 10. As shown, bottom support plate 84 has a circular opening 86 therethrough. The reservoir 60 sits supported on shoulder 79 of the support plate 84 with the neck 58 of the reservoir 60 extending through opening 86 and secured in the opening as by a friction fit, clamping and the like. A cover member 85 is hinged to an upper forward extension 87 of the back plate 80 so as to permit replacement of reservoir 60 and its pump assembly 10.

Support plate 84 carries at a forward portion thereof an actuating lever 88 journalled for pivoting about a horizontal axis at 90. An upper end of the lever 88 carries a hook 94 to engage engagement disc 62 and couple lever 88 to piston 14, such that movement of the lower handle end 96 of lever 88 from the dashed line position to the solid line position, in the direction indicated by arrow 98 slides piston 14 inwardly in a retraction pumping stroke as indicated by arrow 100. On release of the lower handle end 96, spring 102 biases the upper portion of lever 88 downwardly so that the lever draws piston 14 outwardly to a fully withdrawn position as seen in dashed lines in FIG. 1. Lever 88 and its inner hook 94 are adapted to permit manual coupling and uncoupling of the hook 94 as is necessary to remove and replace reservoir 60 and pump assembly 10. Other mechanisms for moving the piston can be provided including mechanized and motorized mechanisms.

In use of the dispenser 70, once exhausted, the empty, collapsed reservoir 60 together with the attached pump 10 are removed and a new reservoir 60 and attached pump 10 may be inserted into the housing. Preferably, the removed reservoir 60 with its attached pump 10 are both made entirely out of recyclable plastic material which can easily be recycled without the need for disassembly prior to cutting and shredding.

It is to be appreciated that in the first embodiment of FIGS. 2 to 4, the inner disc 40 and the intermediate disc 42 form a first stepped pump and, similarly, the intermediate disc 42 and the outer disc 44 form a second stepped pump. The first pump and second pump are out of phase in the sense that in any one retraction or extension stroke while one pump is drawing fluid in, the other is discharging fluid out. This is not necessary in accordance with the present invention.

The present invention preferably requires a sump in which fluid will accumulate and in which an overflow outlet, for example, the inner opening 208 in FIG. 3, is at a height higher than the level to which fluid in the sump is drawn down to between strokes, such that any coalescence of foam or flow down of liquid in the sump between strokes which will result in the level of liquid in the sump increasing may be better accommodated before dripping from the sump may occur.

Figure 5:
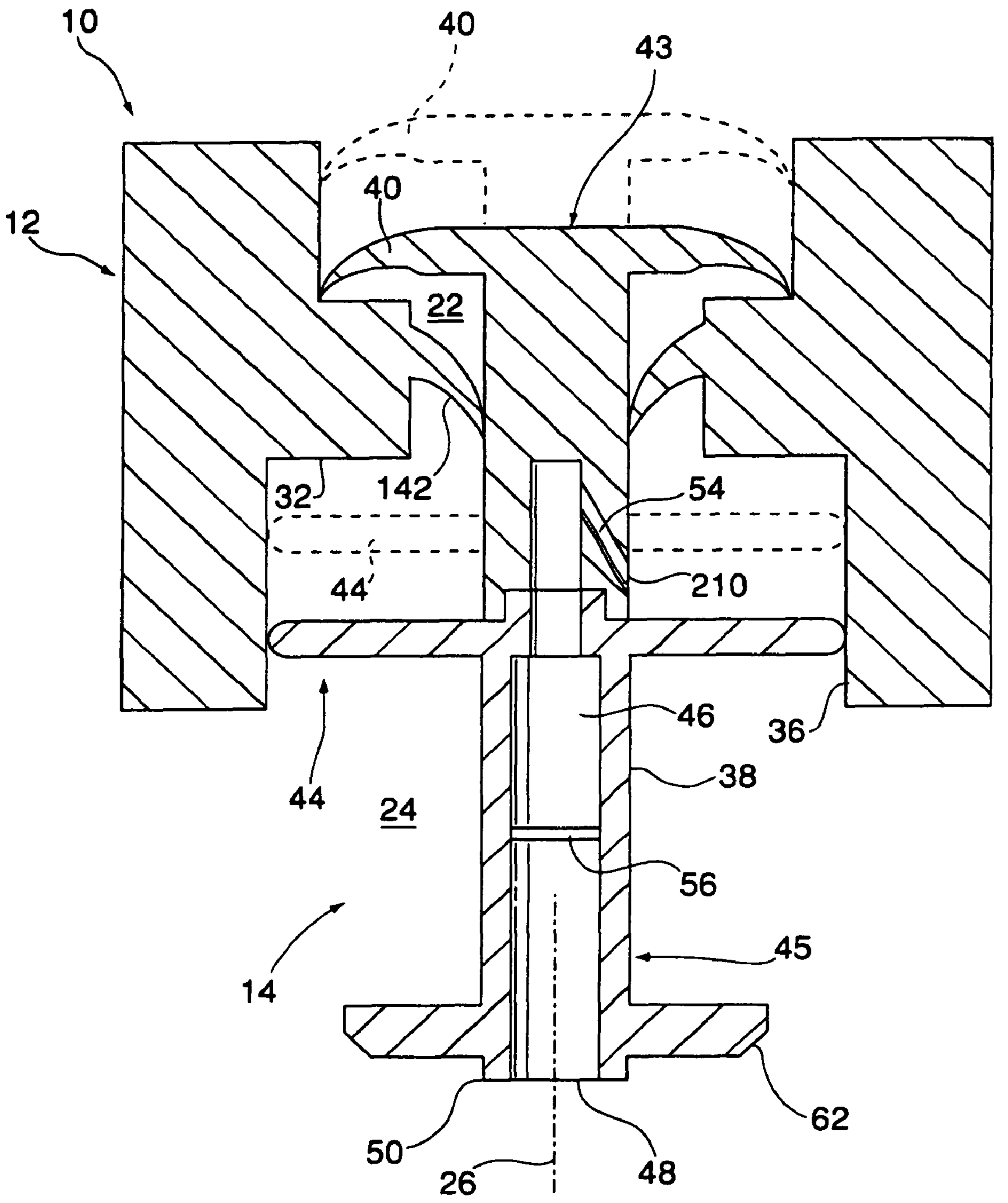
FIG. 5 is a cross-sectional side view of a pump assembly in accordance with a second embodiment of the present invention showing the piston in an extended position.

Reference is made to FIG. 5 which shows a second embodiment of the present invention with the piston 14 in an extended position in solid lines and in a retracted position in dashed lines. The pump assembly 10 of FIG. 5 is the same as that of FIGS. 2 to 4 but modified to remove the intermediate disc 42 from the piston 14 and to provide an equivalent flexible annular intermediate disc or flange 142 to extend inwardly from the body 12 within the intermediate chamber 22. In this regard, the piston 14 has its stem 38 to be of a substantially constant diameter over portions of the outer wall of the stem 38 which the flange 142 is to engage. The piston is shown to be constructed of two parts, an inner portion 43 carrying the inner disc 42 and an outer portion 45 carrying the outer disc 44 as can be advantageous not only for assembly in place in the body 12 but also for ease of making the passageway inlet 54. The central passageway 46 is shown to have a reduced diameter innermost portion to better accommodate the inlet passageway 54.

Reference is made to FIGS. 6 and 7 which show a third embodiment of the invention which is similar in function to the embodiment illustrated in FIG. 2 with similar reference numerals used to refer to similar elements. The embodiment of FIGS. 6 and 7 differs in a number of features.

Firstly, the embodiment of FIG. 6 has two inlet passageways 54 each provided at diametrically opposed locations about the stem 38 and each within a branch tubular member 302 extending from the central tubular portion 202 of the stem 38 radially outwardly and axially outwardly. Each branch tube 302 defines the inlet passageway 54 therein from the outer opening 210 at a distal end of each branch tubular member 302 to the inner opening 208 where the hollow interior of the branch tubular member opens into the central passageway 54. As shown, the cross-sectional area of the inlet passageway 54 preferably reduces from the outer opening 210 to the inner opening 208 although this is not necessary.

FIG. 6 also differs from the embodiment of FIG. 2 in that the outer disc 44 is provided with an inwardly extending annularly outer periphery 304 of reduced diameter for engaging the side wall 36 of the outer chamber 24 to substantially prevent fluid flow in the outer chamber past the outer disc 44 in an outward direction but which may be elastically deformable to permit fluid flow of some air in an inward direction inwardly past the outer disc 44 in a withdrawal stroke.

The embodiment of FIG. 6 further differs from the embodiment of FIG. 2 in that the foam producing screen 56 has been eliminated and replaced by a nozzle member 156 disposed proximate the outlet 48 to at least partially atomized fluid when fluid and air pass therethrough simultaneously. Nozzle member 156 is shown to always be open to provide communication between the atmosphere and the central passageway 46.

Figure 8:
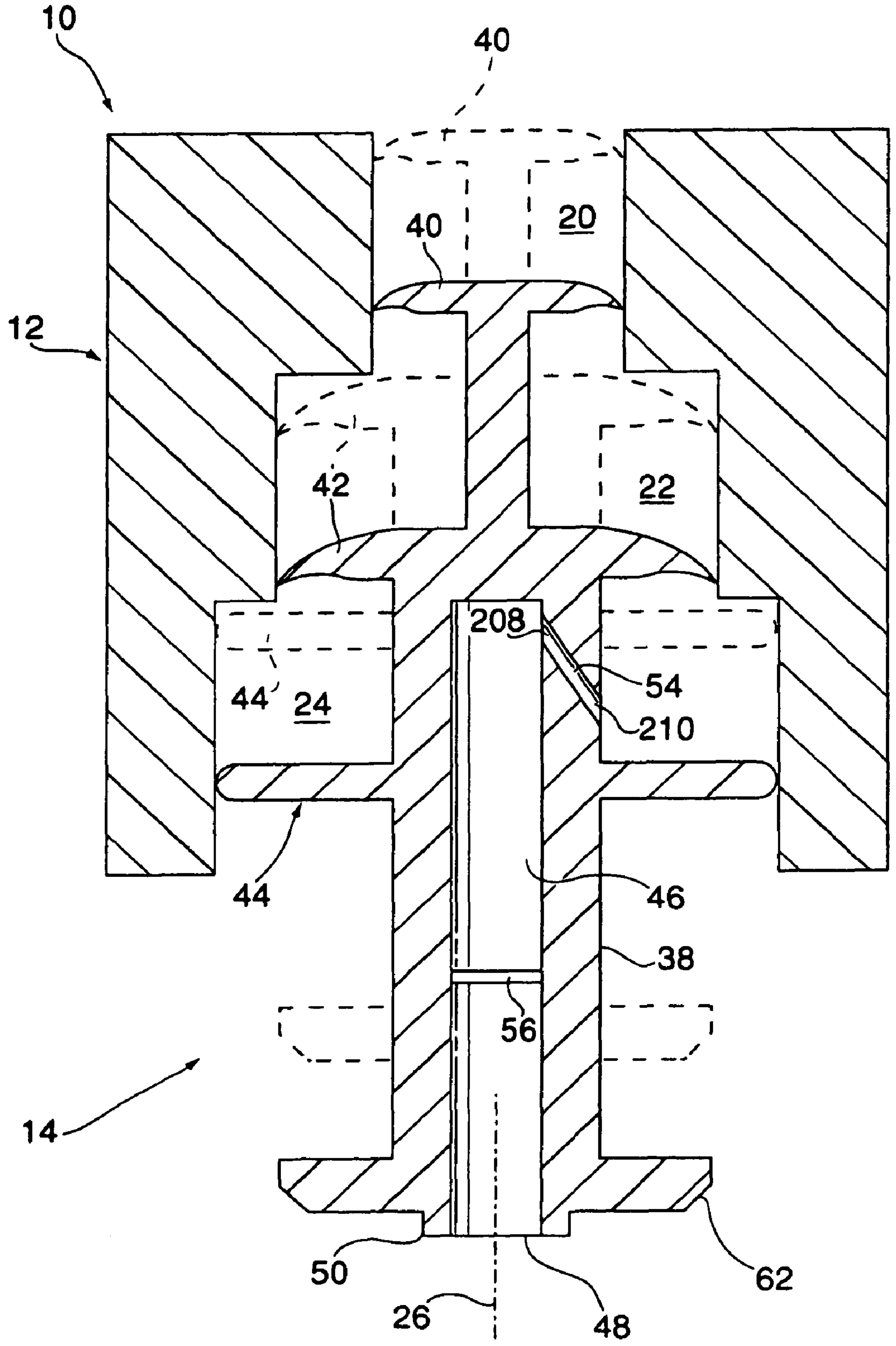
FIG. 8 is a cross-sectional side view of a pump assembly in accordance with a fourth embodiment of the present invention showing the piston in an extended position in solid lines and a retracted position in dashed lines.

FIGS. 2 to 4 illustrate a first embodiment of the invention in which the inner chamber 20 is of a greater diameter than the intermediate chamber 22 and the intermediate chamber 22 is of a greater diameter than the outer chamber 24. Reference is now made to FIG. 8 which illustrates a third embodiment of a foam dispensing pump assembly of the invention in which the inner chamber 20 is of a smaller diameter than the intermediate chamber 22 and the intermediate chamber 22 is of a smaller diameter than the outer chamber 24. The piston illustrated in FIG. 8 has components identical to the components illustrated in FIGS. 2 to 4, however, with a notable difference that the inner disc 40 is smaller than the intermediate disc 42. In FIG. 8, the inner disc 40 and the intermediate disc 42 form a first stepped pump and the intermediate disc 42 an the outer disc 44 form a second stepped pump. The two stepped pumps are in phase in a sense that both operate to discharge fluid outwardly on a retraction stroke and to draw fluid in between their respective discs on an extension stroke. In an extension stroke, the inner pump effectively serves to draw liquid from the reservoir and between the inner disc 40 and the intermediate disc 42 and to discharge it past the intermediate disc 42 between the intermediate disc 42 and the outer disc 44. The second pump serves to draw air inwardly into between the intermediate disc 42 and the outer disc 44 in a withdrawal stroke and to discharge liquid and air outwardly through the outlet 48 in a retraction stroke. As in the case of the first embodiment, the inlet passageway 54 has its inner opening 208 at a height above its outer opening 210.

Figure 9:
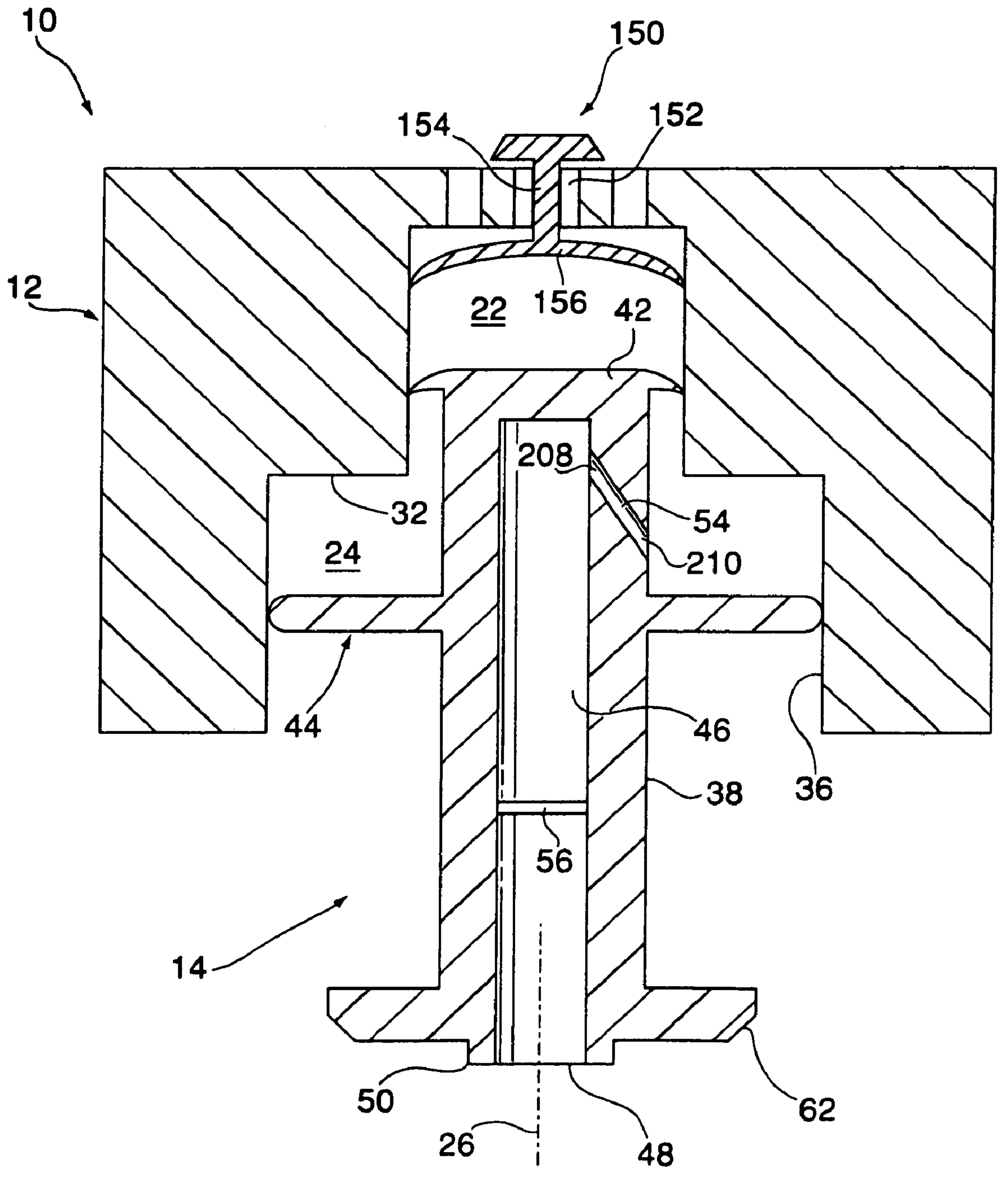
FIG. 9 is a cross-sectional side view of a pump assembly in accordance with a fifth embodiment of the present invention.

In FIGS. 2 to 4, in effect, a one-way valve mechanism for one-way flow outwardly from the reservoir to the chamber 42 is provided by the inner disc 40 in an inner chamber. Reference is made to FIG. 9 which shows a fourth embodiment of the foam dispensing pump assembly of the invention in which the outer chamber 24 is larger than chamber 42 intermediately inwardly therefrom. A one-way valve 150 is provided in an inlet port 152 to the chamber 42. Valve 150 has a stem 154 which carries an inner valve disc 156 which extends radially outwardly from the stem 154 to engage the side wall of the chamber 42. The valve disc 156 has a resilient outer perimeter which is directed outwardly and engages the chamber 42 to prevent fluid flow therepast inwardly yet deflects radially inwardly to prevent fluid flow outwardly therepast. Similar such one-way valves could be used in replacement of the inner disc 40 in the embodiments of FIGS. 2, 6 and 8.

Figure 10:
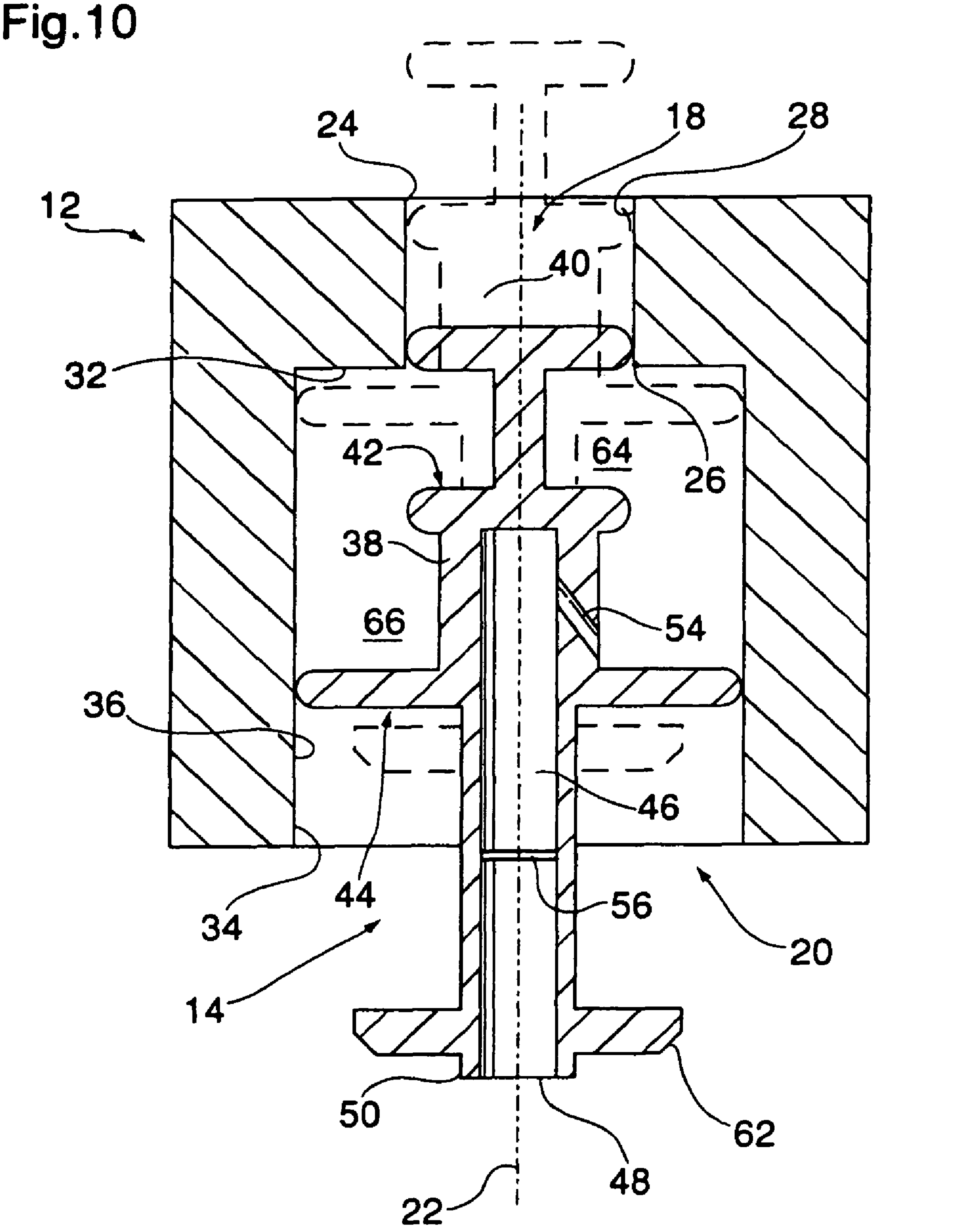
FIG. 10 is a cross-sectional side view of a pump assembly in accordance with a sixth embodiment of the present invention showing the piston in an extended position in solid lines and in a retracted position in dashed lines.

Reference is made to FIG. 10 which illustrates a fifth embodiment for use with a non-collapsible bottle in that in each stroke, some quantity of air is permitted to pass firstly when the pump is in the extended position from between the outer disc 44 and the intermediate disc 42 inwardly past the intermediate disc 42 and, subsequently, when the piston is in the retracted position to pass from between the intermediate disc 42 and the inner disc 40 to past the inner disc 40 and into the reservoir. Relative selection of when each of the discs 40 and 42 come to disengage from their respective chamber and their relative sizes of the different chambers can be used to determine the amount of air which may be permitted to be passed back into a reservoir in any stroke. Preferably, at all times, at least one of the inner disc 40 and the intermediate disc 42 are in engagement with their respective chamber to prevent fluid flow outwardly. In FIG. 10, the piston is shown in solid lines in a preferred fully extended position and in dashed lines in a preferred fully retracted position. The pump of FIG. 10 is of the type disclosed in U.S. Pat. No. 6,409,050 issued Jun. 25, 2002, the disclosure of which is incorporated herein by reference. The pump of FIG. 10, however, differs from the pumps of U.S. Pat. No. 6,409,050 insofar as being modified to provide the advantageous inlet passageway 54 in accordance with the present invention with its inner opening 208 at a height above its outer opening 210.

The pump of FIG. 10 may be modified to avoid the foaming screen 56, in which case the pump may be used without an intention to produce foam and need not have a capability of foaming. Liquid in the outer chamber 66 will tend to settle the lower portion of the outer chamber 66 on top of the outer disc 44, and will tend to be expelled out of passageway 54 via the lower opening 210 before air in the outer chamber 66 above the liquid. After expelling the liquid, air in the outer chamber 66 will then be expelled tending to clear the inlet passageway 54 as well as the central passageway 46 of liquid. Provision of a plurality of inlet passageways 54 circumferentially about the stem 38 with openings 210 at the same height can assist in expelling liquid before air is expelled, enhancing the self cleaning capability.

The relative volumes of the liquid permitted to be displaced in a metered-like manner downwardly from the reservoir between the discs 40 and 42, and the amount of air drawn inwardly into the outer chamber 66 may be relatively selected towards, on one hand, drawing in only as much air as is needed to replace in the reservoir the liquid drawn out in a stroke and, on the other hand, drawing in air sufficient to help urging all of the fluid out of the inlet passageway 54 and the central passageway 46.

Figure 11:
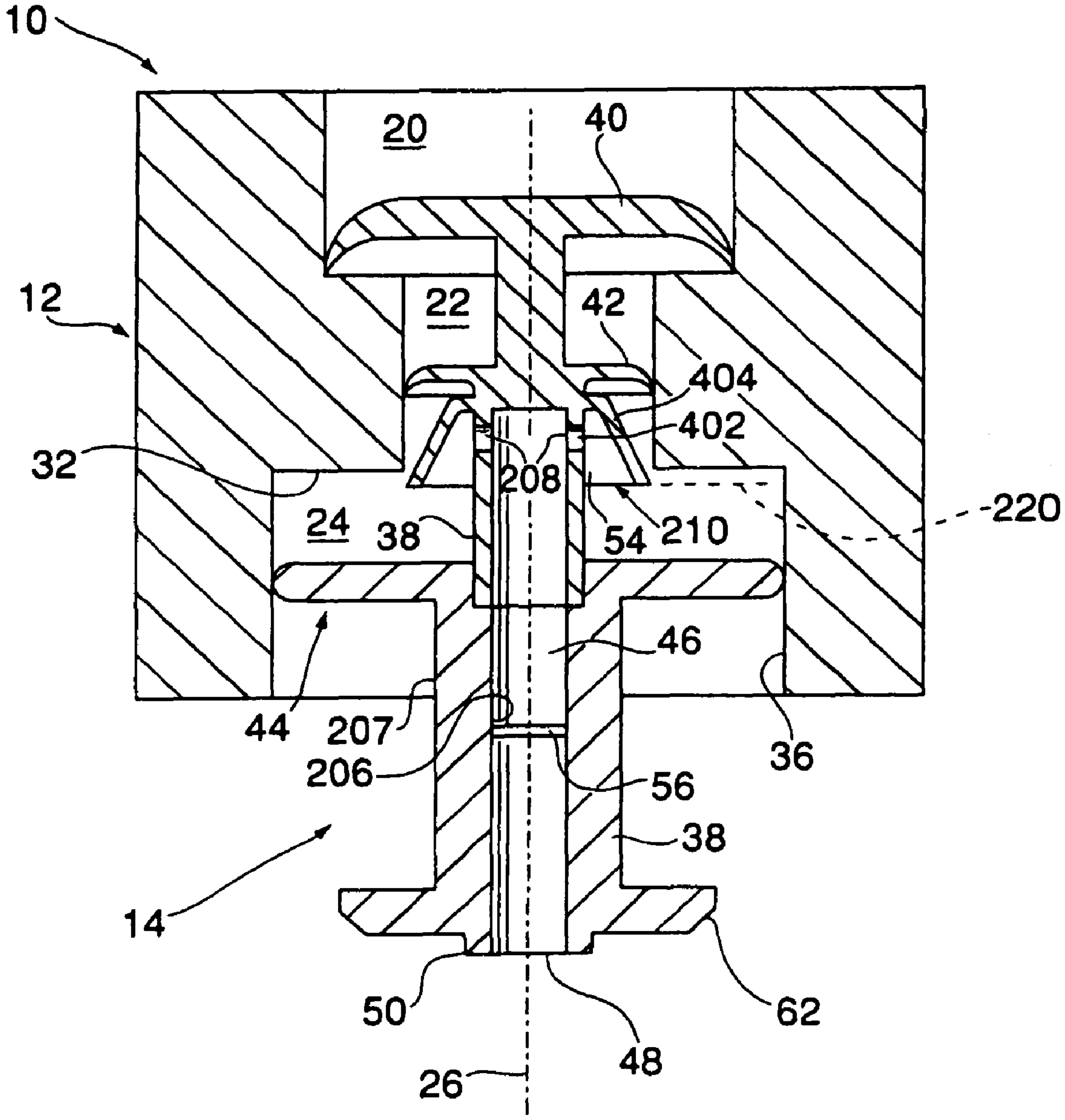
FIG. 11 is a cross-sectional side view of a pump assembly in accordance with a seventh embodiment of the present invention showing the piston in an extended position.

Reference is now made to FIG. 11 which illustrates a seventh embodiment of a foam dispensing pump assembly of the invention. The pump assembly 10 of FIG. 11 is the same as that of FIGS. 2 to 4 but modified so as:

(a) to reduce the outer diameter of the stem 38 between the disc 42 and 44;

(b) to provide a pair of openings 402 through the stem at effectively the same axial location as the inner openings 208;

(c) to provide an annular shrouding disc 404 which is secured at a radically inner end axially inward of the openings 402 and extends radially outwardly and axially outwardly to an outer end 406 disposed at a height indicated by dashed horizontal line 220 below the inner openings 208.

As a result, an inlet passageway 54 is provided including an annular portion defined between the shrouding disc 404 and the stem 38 and a portion formed by the openings 402. Such an inlet passageway 54 has an outer opening 210 annularly about the stem 38 at the height of line 220 and inner openings 208 at the openings 402. FIG. 11 shows that the piston 14 may be formed from two elements, an inner element including the shrouding disc 404, intermediate disc 42 and inner disc 40 and an outer element including the outer flange 44 and engagement flange 62 so as to facilitate manufacture of the shrouding disc 404.

Figure 12:
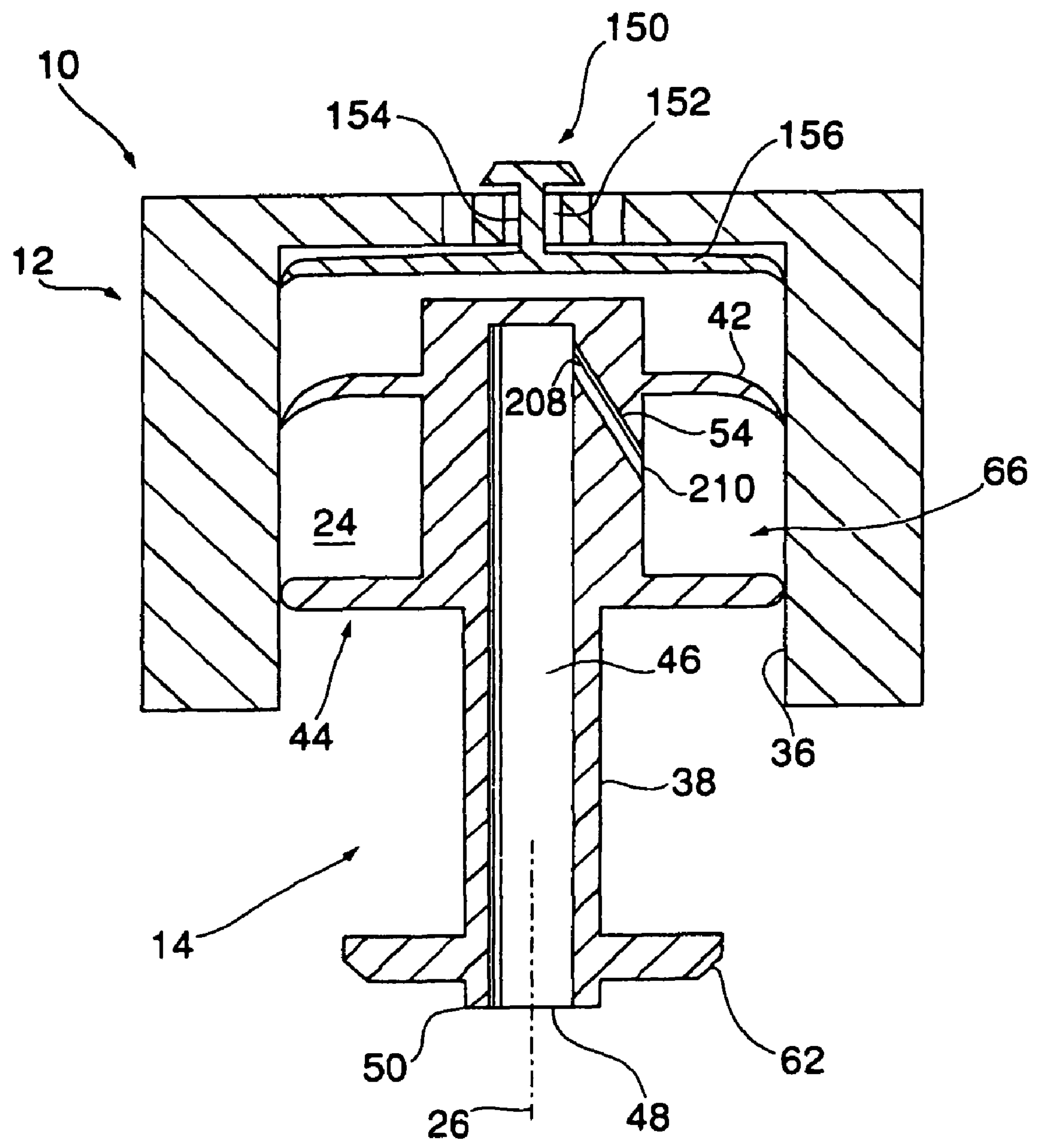
FIG. 12 is a cross-sectional view of a pump assembly in accordance with an eight embodiment of the present invention.

Each of the pumps of FIGS. 2 to 10 is adapted for simultaneously dispensing liquid and air out of the outlet 48. Reference is made to FIG. 12 which shows an eighth embodiment in accordance with the present invention which is adapted merely for dispensing liquid from a reservoir out of the outlet 48. The embodiment of FIG. 12 is substantially the same as the embodiment of FIG. 9, however, with a notable exception that the piston is provided slidable within a single chamber 24 of substantially constant diameter. As well, it is notable that the screen 56 is not provided. The pump of FIG. 12 is substantially the same in its operation as pumps disclosed in U.S. Pat. No. 5,165,577 to Ophardt, issued Nov. 24, 1992, the disclosure of which is incorporated herein by reference. The pump has, however, been modified to provide the improved inner passageway 54 in accordance with the present invention with its inner opening 208 at a height above its outer opening 210.

When a pump of the type shown in FIG. 12 is left inactive after use, there is a tendency of fluid to drip out of the outlet 48 as by air moving up through the outlet 48 to attempt to displace liquid. Liquid in communication with outlet 48 includes liquid within the outer compartment 66, liquid within the inlet passageway 54 and liquid within the central passageway 46. With the arrangement in FIG. 12, at the least, fluid within the compartment 66 will only flow out of the outer compartment chamber 66 when the height of liquid in the outer compartment 66 is above the inner opening 208 of the inlet passageway 54. Preferably, therefore, the inner opening 208 will be as high as possible relative to the outer compartment and FIG. 12 illustrates an advantageous arrangement in which the inner opening 208 is, in fact, above the height of the disc 42. Of course, providing the inner opening 208 at least some height above the outer opening 210 provides some enhanced benefits. The embodiment of FIG. 12 might be preferably advantageous for use, for example, with low viscosity fluids, such as alcohol, in which at the end of the stroke, alcohol within the central passageway 46 will readily be displaced by air and flow outwardly yet alcohol within the outer compartment 66 will not be able to flow outwardly.

In each of the embodiments of FIGS. 2 to 12, a sump is provided as the bottom of the annular outer compartment 66, defined above the outer disc 44 and with an overflow outlet provided as the inner opening 208 to the inlet passageway 54 to prevent dripping under gravity due to liquid which comes to be in the sump, whether liquid from the reservoir, or drawn back liquid or liquid from coalesced drawn back foam unless the liquid is above the height of the inner opening 208.

In the Figures other than FIGS. 6 and 7, only one inlet passageway 54 is shown to provide communication from the outer compartment 66 to the central passageway 46. One or more similar inlet passageways 54 may be provided as at circumferentially spaced locations about the central axis, preferably with the inner openings 208 at the same height. The preferred inlet passageway 54 is shown as circular in cross-section however this is not necessary.

It is to be appreciated that the nature of the liquid to be dispensed including its viscosity and flow characteristics will be important in order for a person skilled in the art to make suitable selection of the relative sizes and dimensions and resistance to flow provided by the various passageways, inlets, outlets and screens and/or past the various discs. As well, the quantity of liquid desired to be dispensed in each stroke will have a bearing on the relative proportion and sizing of the components including particularly the inner compartment 64, outer compartment 66, the axial length of a stroke of the piston, and the height of the inner opening 208 of the inlet passageway above the outer opening 210.

In the preferred embodiments, the engagement disc 62 is provided on the piston 14 for engagement to move the piston inwardly and outwardly. It is to be appreciated that various other mechanisms can be provided for engagement and movement of the piston relative the body 12.

Most of the preferred embodiments show dispensers for passing liquid and air through a screen 56 to dispense the liquid as a foam. The foaming screens could be replaced by another orifice device such as an atomizing nozzle of FIG. 6 to produce a mist or spray.

The preferred embodiments of the invention show the central passageway 46 and the inlet passageway 54 for dispensing of the air and/or liquid as being provided internally within a piston. Such an arrangement is believed preferred from the point of view of ease of construction of the pump assembly 10. However, it is to be appreciated that such passageways for dispensing the liquid and/or foam may be provided, in whole or in part in the body 12.

While this invention has been described with reference to preferred embodiments, the invention is not so limited. Many modifications and variations will now occur to persons skilled in the art. For a definition of the invention, reference is made to the appended claims.

We claim:

1. A piston pump assembly having a first pump comprising a piston chamber-forming member having a first chamber disposed about a first central axis and having a cylindrical side wall, an axially outer open end of the first chamber being open downwardly, a piston-forming element received in the first chamber axially slidable inwardly and outwardly therein between an outward extended position and an inward retracted position, the piston-forming element having an axially extending stem, a first disc spanning radially between the stem and the first chamber side wall preventing fluid flow outwardly there past, a passageway through the stem providing communication from inside the first chamber outwardly past the first disc through the outer open end of the first chamber, the passageway opening at an outer opening in the first chamber and at an outlet outwardly of the first disc, the passageway having a central passageway portion and an inlet passageway portion, the central passageway portion extending through the stem along the central axis, the central portion passageway extending inwardly from the outlet along the central axis to an inner end disposed at a height above the outlet, the inlet passageway portion extending through the stem along an inlet axis which extends radially outwardly and axially outwardly relative the central axis, the inlet passageway portion opening into the central passageway portion at an inner opening proximate the inner end, the inlet passageway portion extending from the inner opening downwardly through the stem about the inlet axis to the outer opening the outer opening disposed at a height below the inner opening, and the outer opening disposed at a height above the outlet.

2. A piston pump assembly as claimed in claim 1 wherein:

the stem comprises a generally cylindrical central tubular member about the first central axis defining the inlet passageway portion of the passageway therein with the outlet of the passageway at an outermost end of the central tubular member, the central tubular member carrying a branch tubular member extending from the central tubular member radially outwardly and axially outwardly about the inlet axis, the branch tubular member defining the inlet passageway portion of the passageway therein with the outer opening of the passageway at an outermost end of the branch tubular member.

3. A piston pump assembly as claimed in claim 1 wherein the first disc is carried on the stem and extending radially outwardly from the stem for engagement with the first chamber side wall to prevent fluid flow outwardly therepast.

4. A piston pump assembly as claimed in claim 3 wherein:

in reciprocal sliding of the piston-forming element in the first chamber in a cycle of operation including an inward stroke from the extended position to the retracted position and an outward stroke from the retracted position to the outward position, in one of the inward stroke and outward stroke fluid in the first chamber is displaced from inside the first chamber through the passageway to exit via the outlet, and in the other of the inward stroke and outward stroke fluid is drawn through the outlet into the first chamber via the passageway.

5. A piston pump assembly as claimed in claim 3 wherein:

the first chamber in normal use during or after operation to dispense fluid from the outlet by reciprocal sliding of the piston forming element relative the piston chamber-forming member both air from the atmosphere and liquid from a reservoir become simultaneously disposed in the first chamber, the piston pump assembly including a foam generator disposed in the passageway comprising a porous member for generating turbulence in fluid passing there through to generate foam when air and liquid pass there through simultaneously, and the piston pump assembly includes a liquid pump for providing liquid from the reservoir via a liquid outlet into the first chamber, the liquid capable of foaming.

6. A piston pump assembly as claimed in claim 5 wherein:

the liquid pump having a liquid outlet one way valve across the liquid outlet permitting flow outwardly and preventing flow inwardly.

7. A piston pump assembly as claimed in claim 5 wherein:

the liquid pump is defined by the piston chamber-forming member having a liquid chamber and with the piston-forming element having a liquid disc received in the liquid chamber, the liquid chamber disposed about the central axis and having a cylindrical liquid chamber side wall, the liquid chamber having a liquid chamber inlet opening into the first chamber to the liquid chamber in communication with liquid from a liquid reservoir, a liquid chamber inlet one way valve across the liquid chamber inlet permitting liquid flow therethrough outwardly into the liquid chamber, the liquid outlet comprising an outlet from the liquid chamber, the liquid disc received in the liquid chamber axially between the liquid chamber inlet and the liquid outlet, the liquid disc axially slidable with the piston-forming element inwardly and outwardly in the liquid chamber, the liquid disc extending radially outwardly for engagement with the liquid chamber side wall to prevent fluid flow outwardly therepast, wherein in reciprocal sliding of the liquid disc of the piston-forming element axially inwardly and outwardly in the liquid chamber in one stroke liquid is drawn from the liquid reservoir through the liquid chamber inlet into the liquid chamber, and in an opposite stroke, liquid in the liquid chamber is displaced from inside the liquid chamber out through the liquid outlet, in reciprocal sliding of the liquid disc of the piston-forming element axially inwardly and outwardly in the liquid chamber in a cycle of operation (a) in a first of the inward stroke and the outward stroke simultaneously (i) fluid in the first chamber is displaced from inside the first chamber through the passageway to exit via the outlet and (ii) liquid is drawn from the liquid reservoir through the liquid inlet into the liquid chamber, and (b) in an opposite second of the inward stroke and outward stroke simultaneously (i) fluid is drawn through the outlet into the first chamber via the passageway and (ii) liquid in the liquid chamber is displaced from inside the liquid chamber out through the liquid outlet.

8. A piston pump assembly as claimed in claim 7 wherein one or both of the first chamber and the liquid chamber comprises a stepped cylinder.

9. A piston pump assembly as claimed in claim 5 wherein the first pump and liquid pump are out of phase with, in reciprocal sliding of the piston-forming element axially inwardly and outwardly in a cycle of operation, (a) in a first of the inward stroke and the outward stroke simultaneously (i) fluid comprising air and liquid in the first chamber is displaced from inside the first chamber through the passageway to exit via the outlet, and (ii) liquid is drawn from the liquid reservoir into the liquid chamber, and (b) in an opposite, second of the inward stroke and the outward stroke simultaneously (i) fluid comprising air and liquid is drawn through the outlet into the first chamber via the passageway, and (ii) liquid in the liquid chamber is displaced from inside the liquid chamber out through the liquid outlet.

10. A piston pump assembly as claimed in claim 5 wherein the first pump and liquid pump are in phase with, in reciprocal sliding of the piston-forming element axially inwardly and outwardly in a cycle of operation, (a) in a first of the inward stroke and the outward stroke simultaneously (i) fluid comprising air and liquid in the first chamber is displaced from inside the first chamber through the passageway to exit via the outlet, and (ii) liquid in the liquid chamber is displaced from inside the liquid chamber out through the liquid outlet, and (b) in an opposite, second of the inward stroke and the outward stroke simultaneously (i) fluid comprising air and liquid is drawn through the outlet into the first chamber via the passageway, and (ii) liquid is drawn from the liquid reservoir inlet into the liquid chamber.

11. A piston pump assembly as claimed in claim 5 wherein the outlet is at a height below a height of fluid in the chamber, the chamber is always open to the outlet, and the chamber is in operation to simultaneously have both liquid and air in the chamber.

12. A piston pump assembly as claimed in claim 11 wherein in operation of the first pump, fluid between the chamber and the outlet is drawn back into the chamber via the passageway.

13. A piston pump assembly as claimed in claim 5 wherein the first pump is adapted to dispense from the outlet the liquid admixed with air as foam and in operation of the first pump fluid including foam between the chamber and the outlet is drawn back into the chamber via the passageway.

14. A piston pump assembly as claimed in claim 12 wherein the chamber and passageway form a sump into which liquid in the chamber will flow due to gravity with a sump volume being a volume of fluid which can be accommodated in the sump without overflow out the passageway to the outlet due to gravity being defined by the cumulative volume in the chamber and in the passageway below the upper end.

15. A piston pump assembly as claimed in claim 14 in which the chamber has a chamber volume sufficient to accommodate any fluid in the chamber at the end of the draw back, plus any foam drawn back into the chamber via the passageway from between the chamber and the outlet, and with the sump volume being at least equal to the liquid in the chamber at the end of the draw back plus liquid resulting if all foam drawn back into the chamber was to coalesce into liquid.

16. In a piston pump for dispensing fluids including liquid from a chamber out an outlet which is at a height below a height of fluid in the chamber, and in which the chamber is always open to the outlet and the chamber is in operation to simultaneously have both liquid and air in the chamber, the chamber defined between a piston chamber-forming member and a piston-forming element reciprocally slidable therein, the outlet provided on the piston-forming element, the improvement comprising a passageway through the piston-forming element from the chamber to the outlet, the passageway open to the chamber at an outer opening at a first height, the passageway having a central passageway portion and an inlet passageway portion, the central passageway portion extending through the stem coaxially along the central axis, the central passageway portion extending inwardly from the outlet coaxially along the central axis to a closed inner end disposed at a height above the outlet, the inlet passageway portion extending downwardly through the stem from the central passageway portion to the chamber, the inlet passageway portion opening into the central passageway portion at an upper end proximate the closed inner end, the inlet passageway portion opening into the chamber at the outer opening, an inlet axis which extends radially outwardly and axially outwardly from the central axis between the upper end of the inlet portion and the outer opening, the inlet passageway portion extending from the central passageway portion downwardly through the stem about the inlet axis to the chamber, the upper end at a second height higher than the first height and at a height above a height of the outlet.

17. A piston pump assembly as claimed in claim 1 wherein the inlet axis is in a flat plane including the central axis, the inlet axis in extending radially outwardly and axially outwardly relative the central axis is in the flat plane disposed at an angle to the central axis.

18. A piston pump assembly as claimed in claim 17 wherein the inlet passageway portion is circular in any cross-section normal to the inlet axis.

19. A piston pump assembly as claimed in claim 13 wherein the inlet axis is in a flat plane including the central axis, the inlet axis in extending radially outwardly and axially outwardly relative the central axis is in the flat plane disposed at an angle to the central axis.

20. A piston pump assembly as claimed in claim 13 wherein:

the inner opening including an axially outermost portion where the inner opening opens into the central passageway portion, the outlet opening having an axially innermost portion where the outer opening opens into the first chamber, the axially innermost portion of the outer opening disposed at a height below the axially outermost portion of the inner opening.

* * * * *